US012029946B2

(12) United States Patent
Cleghorn et al.

(10) Patent No.: US 12,029,946 B2
(45) Date of Patent: Jul. 9, 2024

(54) ILLUMINABLE DEVICE WITH LOW REVERSE TORQUE CLOSURE (71) Applicants: Mark William Charles Cleghorn, Goxhill (GB); Joanne Cleghorn, Goxhill (GB)

(72) Inventors: Mark William Charles Cleghorn, Goxhill (GB); Joanne Cleghorn, Goxhill (GB)

(*) Notice: Subject to any disclaimer, the term of this patent is extended or adjusted under 35 U.S.C. 154(b) by 0 days.

(21) Appl. No.: 17/709,328

(22) Filed: Mar. 30, 2022

(65) Prior Publication Data
US 2022/0323830 A1 Oct. 13, 2022

(30) Foreign Application Priority Data

Mar. 30, 2021 (GB) ........................ 2104491
Dec. 8, 2021 (EP) ........................ 21213276

(51) Int. Cl.
A63B 43/06 (2006.01)
A01K 15/02 (2006.01)
A63B 39/00 (2006.01)
F21L 4/00 (2006.01)
F21L 4/04 (2006.01)
F21V 3/04 (2018.01)
F21V 3/06 (2018.01)
F21Y 115/10 (2016.01)

(52) U.S. Cl.
CPC .............. A63B 43/06 (2013.01); A63B 39/00 (2013.01); F21L 4/00 (2013.01); F21L 4/04 (2013.01); F21V 3/049 (2013.01); F21V 3/0625 (2018.02); A01K 15/025 (2013.01); A01K 15/026 (2013.01); A63B 2225/74 (2020.08); F21Y 2115/10 (2016.08)

(58) Field of Classification Search
CPC ..... A63B 43/06; A63B 2225/74; A63B 39/00; F21V 3/049; F21V 3/0625; F21L 4/00; F21L 15/00; F21L 15/06; A01K 15/025; A01K 15/026; F21Y 2115/10
See application file for complete search history.

(56) References Cited

U.S. PATENT DOCUMENTS 4,893,224 A * 1/1990 Tinley ............... F21V 19/02
                                                  362/372
5,280,842 A * 1/1994 Koo ................. B65D 50/041
                                                  215/220

(Continued)

FOREIGN PATENT DOCUMENTS

CN      204083826 U  *  1/2015  ............ A63B 39/00
GB        2242364 A  * 10/1991  ............ A63B 43/06

Primary Examiner — Alan B Cariaso
(74) Attorney, Agent, or Firm — Ariel S. Bentolila; Bay Area IP Group, LLC (57) ABSTRACT An illuminable ball device including at least one or more LEDs for illuminating said device, an electrical circuitry for controlling said one or more LEDs, a battery for providing power to said electrical circuitry and energize said one or more LEDs, a first housing including a casing, a second housing, a cavity part within said casing, wherein said cavity part is configured to received said second housing, a cap portion, in which said cap portion is configured to secure over said second housing, and wherein said cap portion and said second housing is attached to said casing part by a low reverse torque closure.

18 Claims, 8 Drawing Sheets (56) References Cited

U.S. PATENT DOCUMENTS

| | | | | |
|---|---|---|---|---|
| 5,609,262 | A * | 3/1997 | Trout | B29C 45/4407 |
| | | | | 215/219 |
| 6,117,030 | A * | 9/2000 | Green, Sr. | A63B 43/06 |
| | | | | 473/570 |
| 2007/0021244 | A1 * | 1/2007 | Ko | A63B 41/00 |
| | | | | 473/570 |
| 2009/0296372 | A1 * | 12/2009 | Schrimmer | A63H 27/10 |
| | | | | 362/189 |
| 2017/0188546 | A1 * | 7/2017 | Ormsbee | F21V 23/0492 |
| 2018/0070560 | A1 * | 3/2018 | Gelardi, II | A63B 43/00 |

* cited by examiner

SECTION A-A

FIG. 3a

SECTION B-B

SECTION F-F

FIG. 6c

SECTION E-E

ILLUMINABLE DEVICE WITH LOW REVERSE TORQUE CLOSURE

CROSS-REFERENCE TO RELATED APPLICATIONS

The present Utility patent application claims priority benefit of the United Kingdom foreign patent application #2104491.2, filed on 30 Mar. 2021, entitled "UKEAS-YPEASY1" under 35 U.S.C. 119(a), and priority benefit of the European foreign patent application No. EP21213276, filed on 8 Dec. 2021, entitled "Illuminable Ball", under 35 U.S.C. 119(a). The contents of this/these related patent application(s) is/are incorporated herein by reference for all purposes to the extent that such subject matter is not inconsistent herewith or limiting hereof.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to illuminated devices. More particularly, certain embodiments of the invention relate to illuminable balls used in the exercise of pets.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that generally, dogs enjoy chasing and fetching balls. The likelihood of the ball being lost, especially at night, is increased. Typical phosphorescent balls are illuminated balls that tend to quickly fade and light from them cannot be guaranteed.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7c shows a cross-section along double arrow-headed lines D-D of FIG. 7a, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof"); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In *re Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or a generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them— Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments of the present invention and variations thereof, relate to illuminated ball devices. In one embodiment of the present invention, an exercise ball for pets which include an illuminable ball is provided having a translucent spherical hollow casing in which is housed illumination means comprising, but not limited to, at least one or more LEDs and control means arranged to illuminate the at least one or more LEDs. A cover means providing access to the illumination means inside the hollow casing wherein the cover means is attached to the casing by a low reverse torque closure assembly. The low reverse torque closure may comprise a child-resistant closure involving a simultaneous application of a linear force along an axis together with a rotation around the axis in a removal direction to remove/release the cover means from the hollow casing. The linear force may involve a downward force (directed towards the ball), the removal/release direction is a counter-clockwise direction, and the engagement direction is a clockwise direction. Alternatively, the removal/release direction is clockwise direction, and the engagement direction is counter-clockwise direction.

The child-resistant closure is a closure that may discourage unauthorised opening by requiring the combination of simultaneous actions, by pressing downwards or lifting upwards combined with a rotation. The downward or upward linear force may bring an inner and outer member into engagement so that a rotation in a counterclockwise direction removes the cover. The child resistant closures may also be described as low or negligible reverse torque closure since the closure comprise a ratcheting assembly that provides negligible reverse torque during undepressed counterclockwise rotation of the outer member. The torque caused by frictional contact of the outer and inner members when the undepressed closure is turned in the counter-clockwise direction being low or negligible in the sense that it is insufficient to cause removal of the cover from the closure.

The low reverse or negligible torque closure may further include, but not limited to, an inner latch formed by an internally screw threaded cylindrical first member which is concentrically retained to be captive within an outer latch formed by a cylindrical second member having a base upon which are formed first ratchet teeth abutting with a ramp means on a facing wall of the first member when the inner latch is turned in a first direction to rotate the inner latch into the outer latch, causing the internal screw threads on the cylindrical first member to cooperate with mating threads on the cover means to securely close the hollow casing. The first ratchet teeth may slide up and over the ramp means with negligible back ratchet torque when the inner latch is turned in a second direction opposite to the first direction without the application of a downforce by virtue of at least one resilient spring member disposed in the base of the second member so as to form a space between the first and second members until a downward force against the at least one spring member is applied on the inner latch. A torque simultaneously applied on the inner latch may cause the first ratchet teeth to engage with second ratchet teeth on the first member and the inner latch is rotated in a second direction to remove the cover means.

In some embodiments, the ramp means may define a low friction surface during undepressed counter-clockwise rotation of the cover means and a contact area during clockwise rotation of the cover means. The second ratchet teeth may define a contact area for removal of the cover means from the hollow casing when the cover means is depressed.

In other embodiments, a slot is provided in an outer surface of the cover means for insertion of a removal implement arranged to provide a downward force and a twisting torque to remove the cover means from the hollow casing. The cover means comprises a cap in which the slot is located, and the cap is mattingly secured to a housing within which is mounted the control means, the housing having an external screw thread arranged to mate with the internal screw thread of the cylindrical first member.

In further embodiments, the control means includes an inertial switch which is normally closed, arranged to open upon activation by a predetermined G-force to permit a power source to energize the at least one or more LEDs. The power source is at least one battery cell which is accessed by rotating the cover means in the second direction and applying a downward force to lock the inner and outer latches together so that a combination of cap and housing may be unscrewed from the inner latch, whereas without the application of a downward force, the inner latch may rotatably slide over the outer latch.

The present invention will now be described in detail with reference to embodiments thereof as illustrated in the accompanying drawings.

Figure 1:
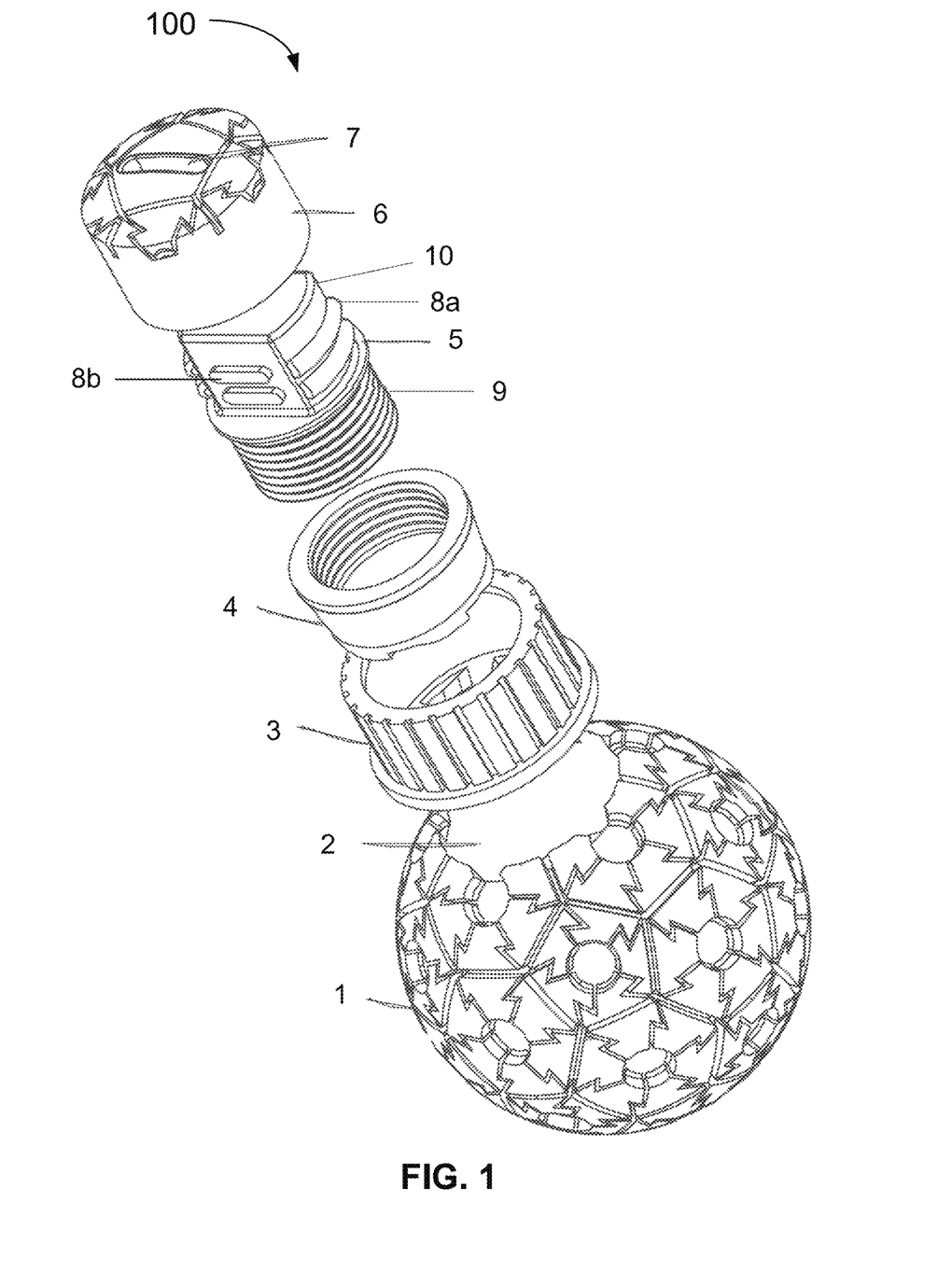
FIG. 1 shows an exploded perspective view of an exemplary illuminable ball, in accordance with an embodiment of the present invention.
Figure 8:
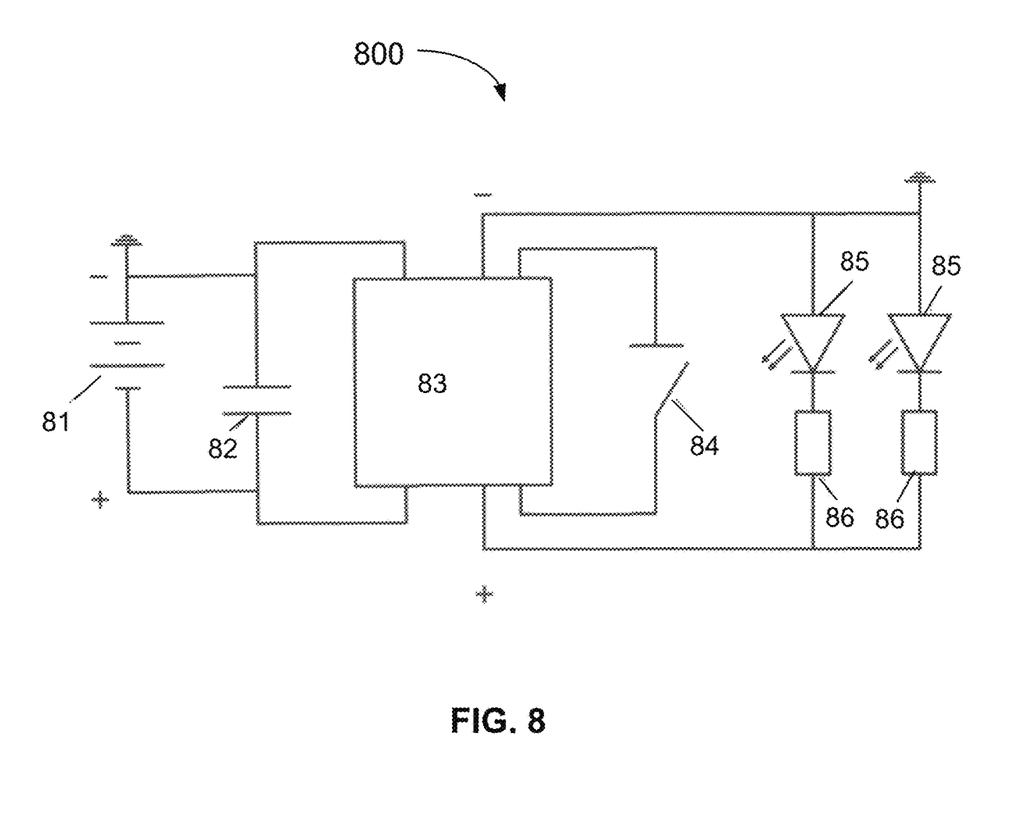
FIG. 8 shows a circuit diagram of an exemplary electrical circuitry for the illuminable ball, in accordance with an embodiment of the present invention.

FIG. 1 shows an exploded perspective view of an exemplary illuminable ball 100, in accordance with an embodiment of the present invention. Referring to FIG. 1, the illuminable ball has a translucent spherical hollow casing 1 made from, but not limited to, silicone or thermoplastic rubber (TPR) having a textured and patterned outer surface. Casing 1 is a (first) housing having an opening 2 (battery housing opening) through and in which is located the series connection of an outer latch 3, an inner latch 4 which is retained within the outer latch 3, a (second) housing 5, and a cap 6. Inner latch 3 has an internal screw thread which mates with an external screw thread on lower portion 9 of (second) housing 5. Cap 6 is arranged to be a push fit and is secured over an end of (second) housing 5 remote from the external screw thread. The cap has a partially diametrically extending slot 7 for insertion of a removal implement such as a screwdriver, or coin, to screw the combination of cap 6 and second housing 5 into and out of inner latch 4. Housing 5 has external ridges 8a and protrusions 8b which hold cap 6 in place. Referring to FIG. 1 and FIG. 8, housing 5 is arranged to mount a power source 81, such as but not limited, to one or more batteries, and electrical circuitry 81-84 such as but not limited to a control board that is configured to be operable for illuminating one or more illuminating elements such as but not limited to LEDs 85.

Figure 2A:
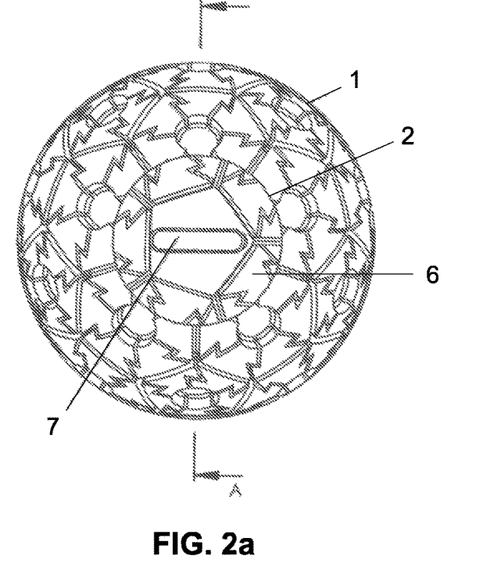
FIG. 2a shows a top view of the illuminable ball of FIG. 1, in accordance with an embodiment of the present invention.
Figure 2B:
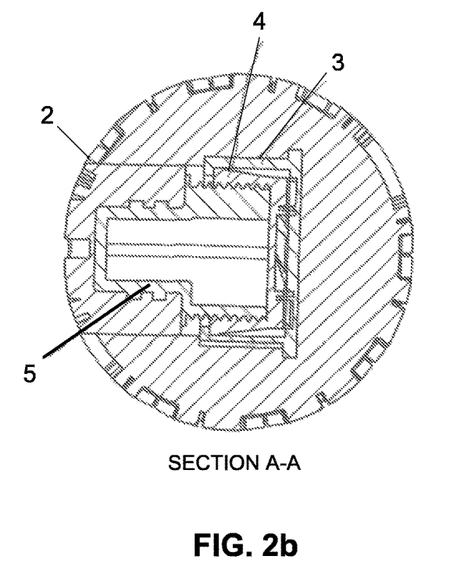
FIG. 2b shows a cross-sectional view along double arrow-headed lines A-A of FIG. 2a, showing the assembled parts of the illuminable ball in situ, in accordance with an embodiment of the present invention.

FIG. 2a shows a top view of the illuminable ball of FIG. 1, and FIG. 2b shows a cross-sectional view along double arrow-headed lines A-A of FIG. 2a, showing the assembled parts of the illuminable ball in situ, in accordance with an embodiment of the present invention. Referring to FIG. 1, FIG. 2a, and FIG. 2b, casing 1 has an opening 2 through and in which is located the series connection of outer latch 3, inner latch 4 which is retained within outer latch 3, second housing 5, and cap 6. Inner latch 4 internal screw thread mates with the external screw thread on (second) housing 5 which is arranged to mount the power source such as but not limited to one or more batteries and the electrical circuitry for controlling the one or more LEDs.

Figure 3A:
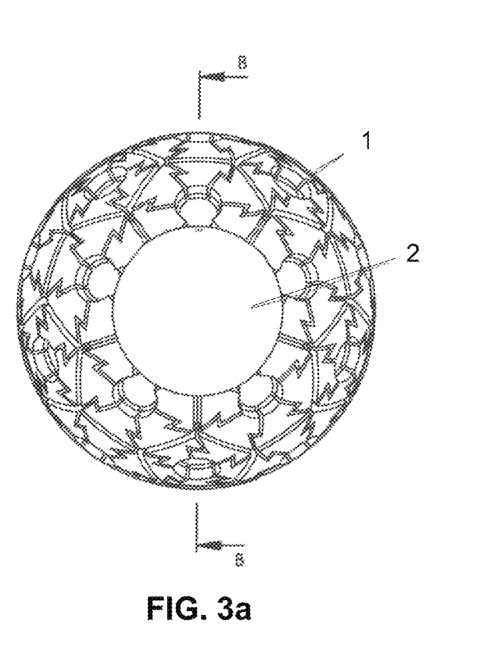
FIG. 3a shows an exemplary illuminable ball casing with the cover removed, in accordance with an embodiment of the present invention.
Figure 3B:
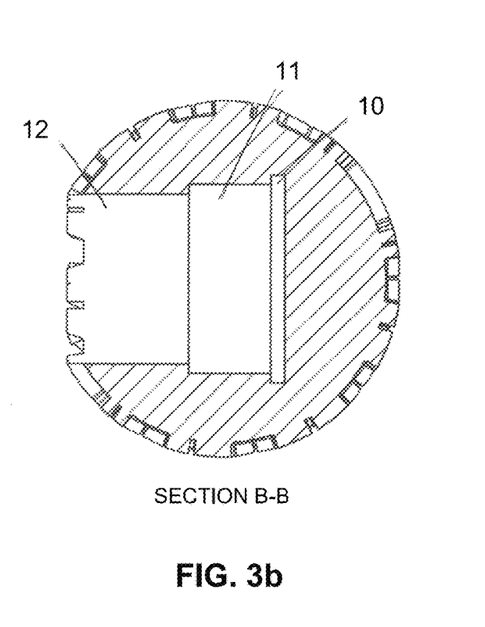
FIG. 3b shows a cross-section along double arrow-headed lines B-B of FIG. 3a, in accordance with an embodiment of the present invention.

FIG. 3a shows an exemplary illuminable ball casing with the cover removed, and FIG. 3b shows a cross-section along double arrow-headed lines B-B of FIG. 3a, in accordance with an embodiment of the present invention. FIGS. 3a and 3b show hollow casing 1 of illuminable ball 100 having three concentric cavities 10, 11, 12. Concentric cavity 11 is configured to receive outer latch 3 and concentric cavity 12 is configured to receive inner latch 4.

Figure 4A:
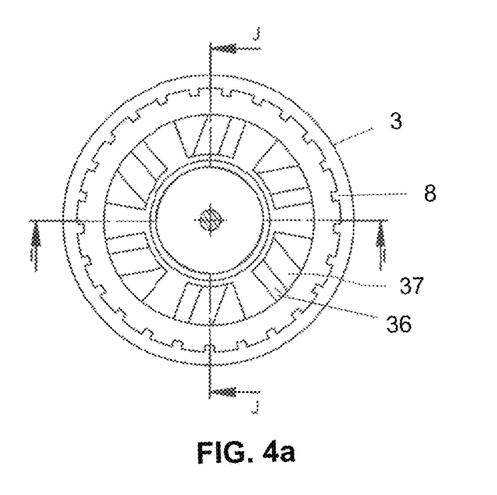
FIG. 4a shows a top view of an exemplary outer latch used in the illuminable ball, in accordance with an embodiment of the present invention.
Figure 4B:
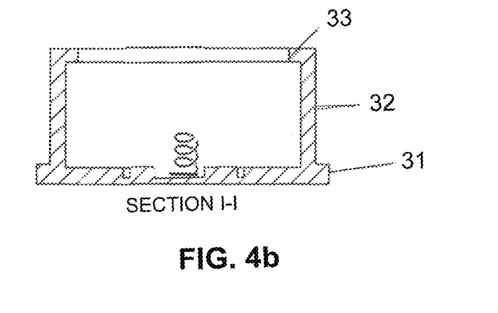
FIG. 4b shows a cross-section along double arrow-headed lines I-I of FIG. 4a, in accordance with an embodiment of the present invention.
Figure 4C:
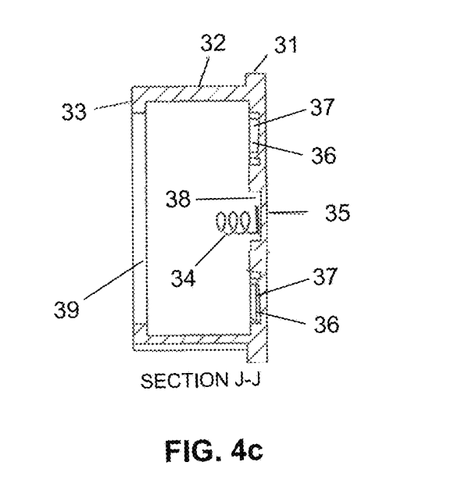
FIG. 4c shows a cross-sectional view along double arrow-headed lines J-J of FIG. 4a, in accordance with an embodiment of the present invention.

FIG. 4a shows a top view of an exemplary outer latch used in the illuminable ball, FIG. 4b shows a cross-section along double arrow-headed lines I-I and FIG. 4c shows a cross-sectional view along double arrow-headed lines J-J of FIG. 4a, in accordance with an embodiment of the present invention. Referring to FIGS. 3a-3b and FIGS. 4a-4c, outer latch 3 may comprise a flat skirt 31, a tubular (third) housing 32, a lip 33, and a resilient spring 34. Cavity 10, a diametrically larger cavity, may provide a flat base to captively hold flat skirt 31. Intermediate cavity 11 locates outer latch 3 to which skirt 31 is attached. A top and open end 39 of (third) housing 32 having a lip 33 for captively securing inner latch 4. Upper cavity 12 engages with and supports the combination of cap 6 and housing 5. Cavity 12 has a screw in mechanism where the top screws into when pushed down and the locking mechanism is engaged.

In some embodiment, a child resistant closure is formed by two nested members or latches. Inner latch 4 and outer latch 3 is provided with cooperating sets of ratchet teeth 36 37 which engage each other when inner latch 4 is rotated in a clockwise direction to close opening 2. When the inner latch 4 is rotated in a removal direction (e.g. counter-clockwise), the ratchet teeth cam or ratchet past each other on inclined surfaces so that the latches may not be removed by mere counter-clockwise rotation. Cooperating sets of ratchet teeth 36 37 of inner latches 4 and outer latch 3 are normally kept apart by a resilient spring 34, one single spring central to a section 35 being shown in the exemplary embodiment, the spring being affixed to an internal cavity section surface 38 of the skirt 31. Formed on cavity space internal surface 38 of the skirt 31, and circumferentially surrounding spring 34, are a plurality of ratchet teeth 36 separated by a plurality of ramps 37. The outer surface of tubular (third) housing 32 is castellated for increased securement into mating castellations in the intermediate cavity 11.

Figure 5A:
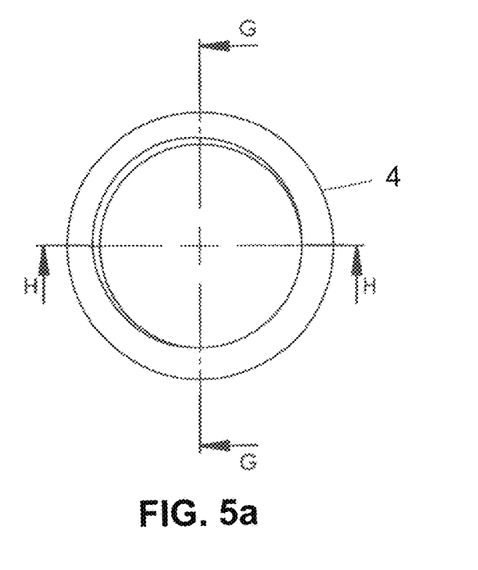
FIG. 5a shows a top view of an exemplary inner latch that is retained within the outer latch, in accordance with an embodiment of the present invention.
Figure 5B:
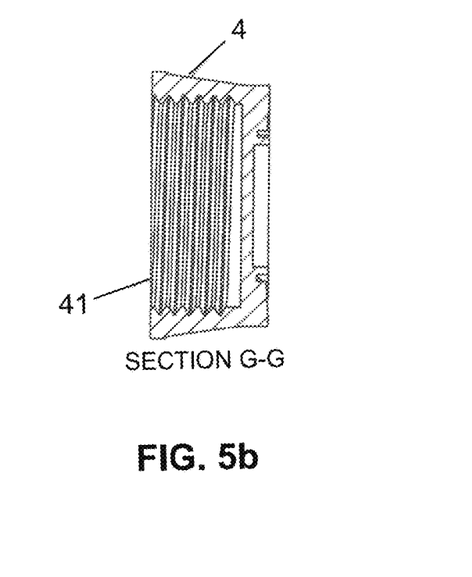
FIG. 5b shows a cross-section along double arrow-headed lines G-G of FIG. 5a, in accordance with an embodiment of the present invention.
Figure 5C:
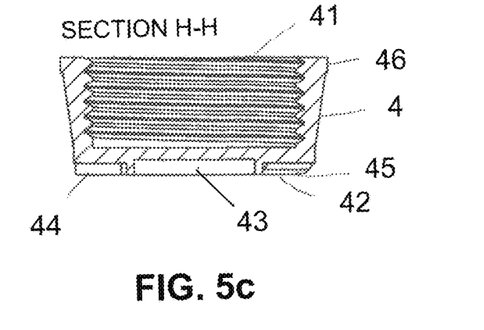
FIG. 5c shows a cross-sectional view along double arrow-headed lines H-H of FIG. 5a, in accordance with an embodiment of the present invention.

FIG. 5a shows a top view of exemplary inner latch 4 that is retained within the outer latch, FIG. 5b shows a cross-section along double arrow-headed lines G-G of FIG. 5a, and FIG. 5c shows a cross-sectional view along double arrow-headed lines H-H of FIG. 5a, in accordance with an embodiment of the present invention. Referring to FIG. 5a, FIG. 5a, and FIG. 5c, inner latch 4 comprises a frusto-conically shaped and has an internal screw thread 41 arranged to mate with a corresponding external screw thread 51 on (second) housing 5. A base 42 of latch 4 has a circumferential rebate 43 against the base of which act leaf springs 34. Formed in base 42 are ramps 44 for abutting with teeth 36 when the inner latch is turned in a first direction to rotate the inner latch in the outer latch so that the external screw thread 51 may engage with internal screw threads 41 to secure housing 5 into inner latch 4. Base 42 also has ratchet teeth 45 to engage with the ratchet teeth 36 when downward pressure is applied on the inner latch to compress the leaf springs 34 so that the ratchet teeth engage and when the inner latch is rotated in a second, counter-clockwise, direction, so the combination of cap 6 and secondary base housing 5 may be unscrewed from inner latch 4.

In some embodiment, an upper external periphery of inner latch 4 has a lip 46 which is arranged to engage under lip 33 when the inner latch is forced into the cavity of outer latch 3.

Figure 6A:
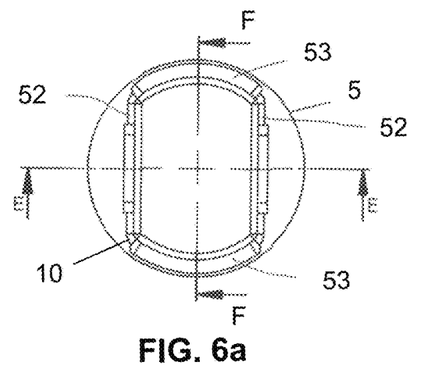
FIG. 6a shows a top view of an exemplary housing for power source and control circuitry, in accordance with an embodiment of the present invention.
Figure 6B:
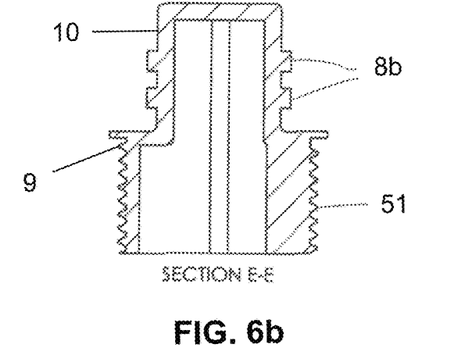
FIG. 6b shows a cross-section along double arrow-headed lines E-E of FIG. 6a, in accordance with an embodiment of the present invention.
Figure 6C:
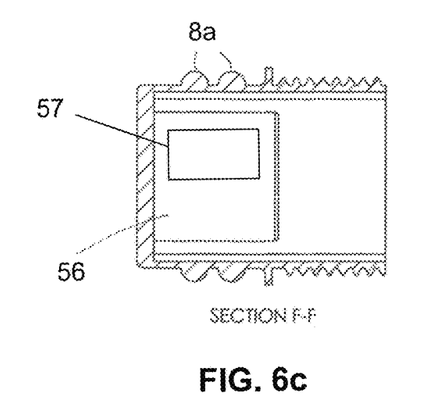
FIG. 6c shows a cross-sectional view along double arrow-headed lines F-F of FIG. 6a, in accordance with an embodiment of the present invention.

FIG. 6a shows a top view of an exemplary housing for power source and control circuitry, FIG. 6b shows a cross-section along double arrow-headed lines E-E of FIG. 6a, and FIG. 6c shows a cross-sectional view along double arrow-headed lines F-F of FIG. 6a, in accordance with an embodiment of the present invention. In one embodiment of the present invention, housing 5 has lower portion 9 thereof formed by external screw threads 51 and upper portion 10 is formed by parallel sides 52 joined by opposing arcuate sides 53. Arcuate sides 53 are provided with a pair of external ridges 8 and parallel sides 52 are provided with a pair of protrusions 8b. Housing 5 has an internal chamber 56 having a base upon which a printed circuit board 57 is mounted for controlling the at least one light emitting diode (LED) 85 and electrical circuitry associated therewith described in FIG. 8.

Figure 7A:
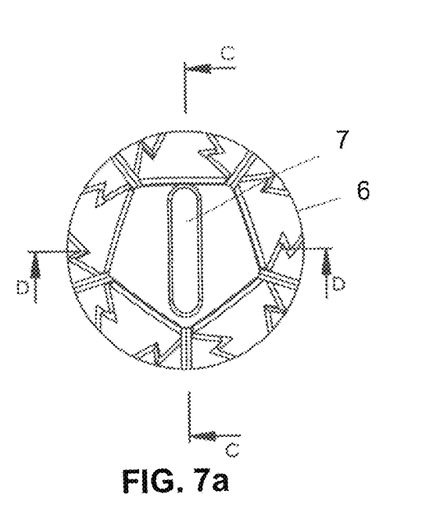
FIG. 7a shows a top view of an exemplary cover that is secured to the housing, in accordance with an embodiment of the present invention.
Figure 7B:
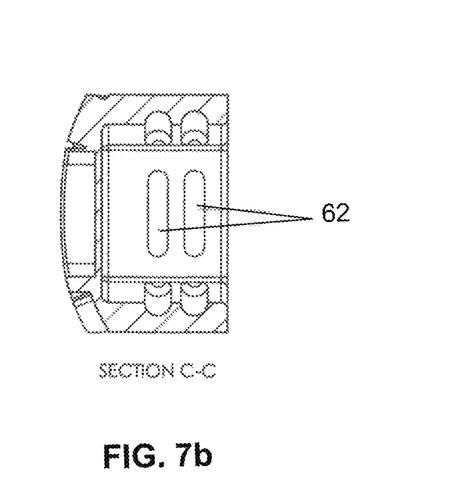
FIG. 7b shows a cross-section along double arrow-headed lines C-C of FIG. 7a, in accordance with an embodiment of the present invention.

FIG. 7a shows a top view of an exemplary cover that is secured to the housing, FIG. 7b shows a cross-section along double arrow-headed lines C-C of FIG. 7a, and FIG. 7c shows a cross-section along double arrow-headed lines D-D of FIG. 7a, in accordance with an embodiment of the present invention. Referring to FIGS. 6a-6c and FIGS. 7a-7b, in one embodiment of the present invention, cap 6 has a first set of internal indentations 61 for mating with external ridges 8a and a second set of internal indentations 62 for mating with protrusions 8b respectively. Cap 6 is a force-fit over housing 5, but may also be secured thereto by adhesive.

FIG. 8 shows a circuit diagram of an exemplary electrical circuitry 800 for illuminable ball 100, in accordance with an embodiment of the present invention. In one embodiment of the present invention, a power source 81 formed by, for example, but not limited to, a pair of serially connected 3-Volt battery cells, such as CR2032 cells, is smoothed by a capacitor 82 and applied to an integrated circuit 83. Integrated circuit 83 is triggered by an inertia switch 84 which is normally closed. Inertia switch 84 may open upon a predetermined G-force so that integrated circuit 83 applies energy to a pair of parallel coupled LEDs 85, each having a load resistor 86. It is to be understood that fewer or more LEDs may be employed. The inertia switch may be arranged to be open-circuited when ball 100 is thrown or when ball 100 strikes the ground and integrated circuit 83 may be arranged to provide pulsating current to LEDs 85 to provide a flashing light or a constant light for a predetermined period of time before inertia switch 84 closes.

Embodiments of the present invention thus provide illuminable ball 100 with power source 81 and associated electrical circuitry secured by a low reverse torque closure assembly of a kind sometimes referred to as a two-piece child-resistant closure, whereby the combination of cap 6, housing 5 and inner latch 4 is freely rotatable until downward pressure is applied and an anti-clockwise turning motion is applied to unscrew housing 5 from the latch so as to obtain access to replace the battery cells of the power source or other electrical components.

Some embodiments of the invention provide an illuminable ball 100 that has a translucent spherical hollow casing 1 in which is housed at least one or more light emitting diode(s) (LED) 85, and electrical control circuitry 81-84 therefor which is arranged to activate the LED upon a predetermined G-force being exceeded. Casing 1 has a cover, (second) housing 5 and cap 6, which is attached to the casing by a low reverse torque closure assembly comprising inner latch 4 and outer 3 latch, whereby inner latch 4 may be rotated in a removeable direction when insufficient force is applied to inner latch 3 so that it is prevented from engaging with outer latch 3 whereby undesired or accidental removal of the housing screwed into inner latch 4 is prevented.

In use, to access the battery, apply a linear force involving a downward force directed along an axis together with a rotation around the axis in a counter-clockwise direction removes/releases the cover from the casing. For example, if the battery is drained and needs replacement. After replacing the battery, apply a linear force involving a downward force directed towards the ball together with a rotation around the axis in a clockwise direction to engage the cover with the casing.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112(1), all claims must be supported by sufficient disclosure in the present patent specification, and any material known to those skilled in the art need not be explicitly disclosed. However, 35 USC § 112(6) requires that structures corresponding to functional limitations interpreted under 35 USC § 112(6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112(6) (post AIA 112(f)) limitation, which exist in at least one of the patents and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112(6). Applicant(s) note that all the identified documents above which are incorporated by reference to satisfy 35 USC § 112(6) necessarily have a filing and/or publication date prior to that of the instant application, and thus are valid prior documents to incorporated by reference in the instant application.

Having fully described at least one embodiment of the present invention, other equivalent or alternative methods of implementing illuminated balls according to the present invention will be apparent to those skilled in the art. Various aspects of the invention have been described above by way of illustration, and the specific embodiments disclosed are not intended to limit the invention to the particular forms disclosed. The particular implementation of the illuminated balls may vary depending upon the particular context or application. By way of example, and not limitation, the illuminated ball described in the foregoing were principally directed to ensuring the ball may be found at night implementations; however, similar techniques may instead be applied to lighting an area or walkway, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A device comprising:
at least one or more LEDs;

an electrical circuitry for controlling said one or more LEDs;
a battery for providing power to said electrical circuity and one or more LEDs;
a first housing including a casing part;
a second housing;
a cavity part within said casing part, wherein said cavity part is configured to receive said second housing;
a cap portion, in which said cap portion is configured to secure over said second housing;
wherein said cap portion and said second housing is attached to said casing part;
an inner latch; and
in which said inner latch comprises a first set of ratchet teeth.

2. The device of claim 1, further comprising an outer latch, in which said outer latch comprises a second set of ratchet teeth.

3. The device of claim 2, wherein a torque applied on said inner latch engages said first set of ratchet teeth with said second set of ratchet teeth to remove said cap portion.

4. The device of claim 3, in which said first set of ratchet teeth engages said second set of ratchet teeth when said inner latch is rotated in a clockwise direction to close said cavity.

5. The device of claim 4, in which said first set of ratchet teeth and said second set of ratchet teeth are kept apart by a resilient spring.

6. The device of claim 5, in which said first set of ratchet teeth are separated by a first set of ramps and said second set of ratchet teeth are separated by a second set of ramps.

7. The device of claim 1, in which said second housing comprises an upper section having external ridges and protrusions that are configured to be operable for holding said cap portion in place.

8. The device of claim 7, in which said cap portion comprises a first set of internal indentations for mating with said external ridges.

9. The device of claim 8, in which said cap portion further comprises a second set of internal indentations for mating with said protrusions.

10. The device of claim 9, in which said cap portion further comprises a slot segment for insertion of a removal implement to screw said cap portion and second housing into and out of said cavity part.

11. The device of claim 1, in which said first housing comprises a translucent, spherical, and hollow casing.

12. The device of claim 11, in which said first housing further comprises at least one of a silicone and thermoplastic rubber.

13. The device of claim 12, in which said first housing further comprises at least one of a textured and patterned outer surface.

14. The device of claim 1, wherein said electrical circuitry includes an inertial switch which is normally closed, said inertial switch is arranged to open upon activation by a predetermined G-force to permit said battery to energize said one or more LEDs.

15. A device comprising:
means for illuminating said device;
means for controlling said illuminating means;
means for providing power to said controlling means and said illuminating means;
means for housing said power providing means, controlling means, and said illuminating means;
means for receiving a second housing;
means for securing said second housing receiving means;
means for attaching said housing means to said second housing receiving means;
an inner latching means with a first set of ratcheting teeth; and
an outer latching means with a second set of ratcheting teeth, wherein said first set of ratcheting teeth is configured to engage said second set of ratcheting teeth.

16. A device comprising:
at least one or more LEDs;
an electrical circuitry for controlling said one or more LEDs;
a battery for providing power to said electrical circuity and said one or more LEDs;
a first housing including a casing part;
a second housing;
a cavity part within said casing part, wherein said cavity part is configured to receive said second housing;
a cap portion, in which said cap portion is configured to secure over said second housing;
wherein said cap portion and said second housing is attached to said casing part;
an inner latch, in which said inner latch comprises a first set of ratchet teeth;
an outer latch, in which said outer latch comprises a second set of ratchet teeth;
wherein said first set of ratchet teeth engages said second set of ratchet teeth when said inner latch is rotated in a clockwise direction.

17. The device of claim 16, in which said second housing comprises an upper section having:
a pair of external ridges; and
a pair of protrusions, wherein said pair of external ridges and pair of protrusions are configured to be operable for holding said cap portion in place, in which said cap portion comprises;
a first set of internal indentations for mating with said pair of external ridges; and
a second set of internal indentations for mating with said pair of protrusions.

18. The device of claim 17, in which said cap portion further comprises a slot segment for insertion of a removal implement to screw said cap portion and second housing into and out of said cavity part, in which said first housing comprises:
a generally translucent, spherical, and hollow casing;
at least one of a silicone and thermoplastic rubber; and
at least one of a textured and patterned outer surface.

\* \* \* \* \*